United States Patent
Sirigu

(10) Patent No.: US 7,832,526 B2
(45) Date of Patent: Nov. 16, 2010

(54) SAFETY DEVICE FOR OPERATOR PROTECTION IN LOW-HEIGHT SHAFT BOTTOM END ELEVATORS AND ELEVATOR EQUIPPED THEREWITH

(75) Inventor: Gérard Sirigu, Gien (FR)

(73) Assignee: Otis Elevator Company, Farmington, CT (US)

( * ) Notice: Subject to any disclaimer, the term of this patent is extended or adjusted under 35 U.S.C. 154(b) by 242 days.

(21) Appl. No.: 11/578,255

(22) PCT Filed: May 5, 2004

(86) PCT No.: PCT/IB2004/001560

§ 371 (c)(1),
(2), (4) Date: Oct. 12, 2006

(87) PCT Pub. No.: WO2005/105644

PCT Pub. Date: Nov. 10, 2005

(65) Prior Publication Data

US 2007/0240942 A1    Oct. 18, 2007

(51) Int. Cl.
*B66B 5/16*    (2006.01)
*B66B 5/26*    (2006.01)

(52) U.S. Cl. .................. 187/357; 187/294; 187/343; 187/360

(58) Field of Classification Search ................ 187/294, 187/343, 357, 360
See application file for complete search history.

(56) References Cited

U.S. PATENT DOCUMENTS 406,630 A * 7/1889 Cowie .................. 187/357
642,448 A * 1/1900 Holmes ................ 187/356

(Continued)

FOREIGN PATENT DOCUMENTS

CH    667 638 A5    10/1988

(Continued)

OTHER PUBLICATIONS

PCT International Preliminary Report on Patentability for PCT/IB2004/001560, dated Feb. 16, 2006.

*Primary Examiner*—Evan H Langdon
(74) *Attorney, Agent, or Firm*—Carlson, Gaskey & Olds PC

(57) ABSTRACT

The safety device according to the invention for operator protection in elevators with a low-height shaft bottom (5), is characterized in that it uses a brace (1) hinged on a base plate (3) secured to the bottom of the shaft (5) and arranged when folded in the horizontal position at a reduced height above the shaft bottom (5) in normal elevator operation, and a buffer element (9) secured underneath the car (11) and adapted to come into contact with a horizontal side surface of the brace (1) in its folded position, wherein said brace (1) is adapted to be moved by an appropriate lifting device (31) to a vertical lifted position in which the buffer element (9) can come into contact with an upper surface (15) of the brace (1), in a condition where the operator can work in the shaft bottom (5), wherein the length of the 15 brace added (1) to the thickness of the buffer element (9) provides for a sufficient depth between the underside of the car (11) and the shaft bottom (5) to suppress any risk for the operator to be crushed in the shaft bottom (5).

17 Claims, 2 Drawing Sheets

U.S. PATENT DOCUMENTS

| | | | | |
|---|---|---|---|---|
| 787,258 A | * | 4/1905 | Austin | 187/343 |
| 2,503,954 A | * | 4/1950 | Lindahl | 187/357 |
| 4,515,248 A | * | 5/1985 | Ohta | 187/343 |
| 5,727,657 A | * | 3/1998 | Foelix | 187/356 |
| 5,806,633 A | * | 9/1998 | Macuga | 187/357 |
| 6,138,798 A | * | 10/2000 | Macuga | 187/294 |
| 6,481,534 B1 | * | 11/2002 | Malone, Jr. | 187/377 |
| 6,736,242 B2 | * | 5/2004 | Nygren | 187/357 |

FOREIGN PATENT DOCUMENTS

| | | |
|---|---|---|
| CN | 2228896 Y | 6/1996 |
| JP | 05201647 A * | 8/1993 |
| JP | 5201647 A * | 8/1993 |
| JP | 8-2849 | 1/1996 |
| JP | 891730 | 4/1996 |
| JP | 9227046 A | 9/1997 |
| JP | 2005170565 A | 6/2005 |
| KR | 1020040019694 A | 3/2004 |
| WO | WO 99/47447 | 9/1999 |

* cited by examiner

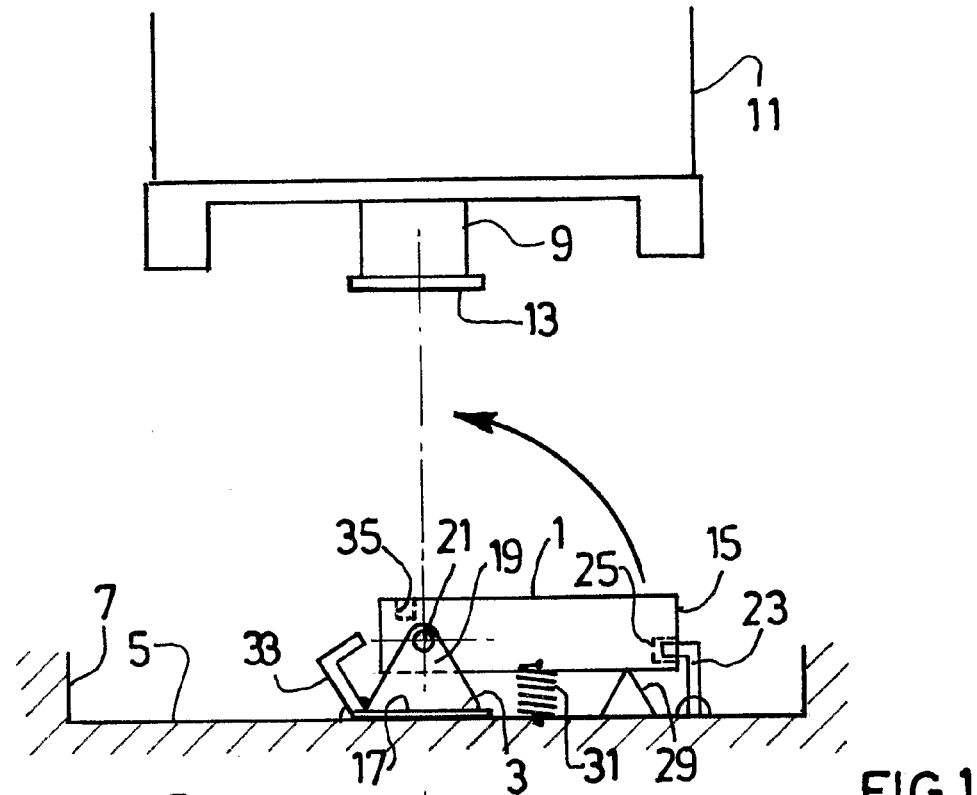
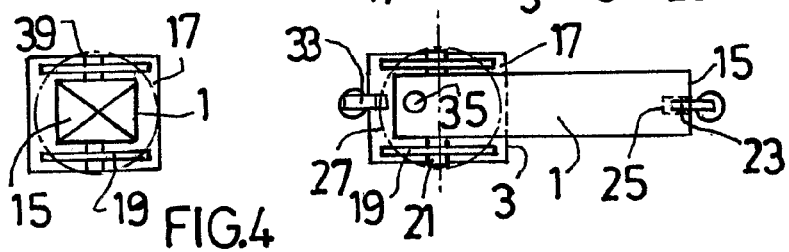
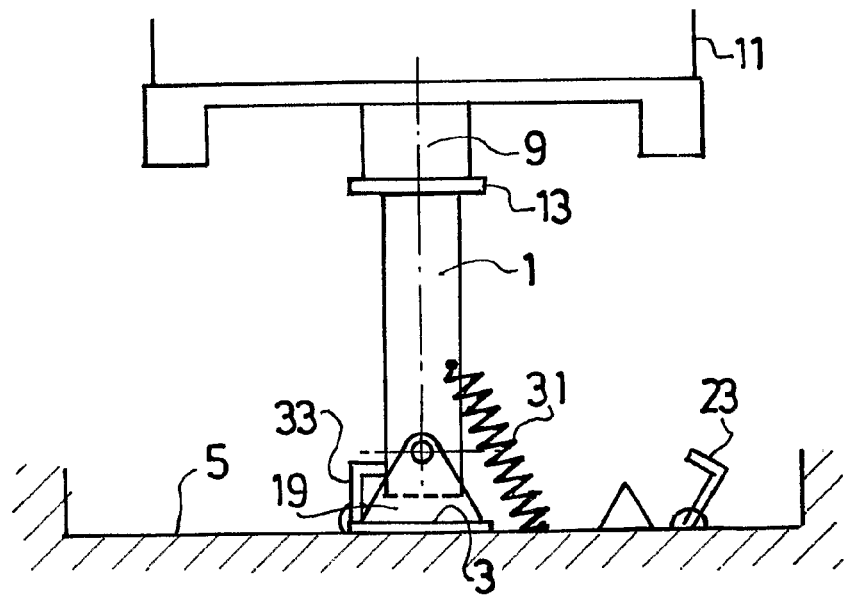

SAFETY DEVICE FOR OPERATOR PROTECTION IN LOW-HEIGHT SHAFT BOTTOM END ELEVATORS AND ELEVATOR EQUIPPED THEREWITH

FIELD OF THE INVENTION

This invention relates to a safety device for operator protection in elevators with a low-height shaft bottom and an elevator equipped therewith.

DESCRIPTION OF THE RELATED ART

Some elevators are known to require a reduced height at shaft bottom, particularly when groundwater layers are located close to ground level. This low height of the shaft bottom relative to the standard height (0.8 to 1.2 m) creates a risk of the maintenance operator being crushed by the elevator car.

SUMMARY OF THE INVENTION

This invention aims at solving this problem and proposes a safety device to protect an operator in elevator shafts with a low height bottom end, characterized in that it uses a brace hinged on a base plate secured to the bottom of the shaft and arranged when folded in the horizontal position at a reduced height above the shaft bottom in normal elevator operation, and a buffer element secured underneath the car and adapted to come into contact with a horizontal side surface of the brace in its folded position, wherein said brace is adapted to be moved by an appropriate lifting device to a vertical lifted position in which the buffer element can come into contact with an upper surface of the brace, in a condition where the operator can work in the shaft bottom, wherein the length of the brace added to the thickness of the buffer element provides for a sufficient depth between the underside of the car and the shaft bottom to suppress any risk for the operator to be crushed in the shaft bottom.

This brace length added to the thickness of the buffer can add up to a standard length, i.e. 0.80 m to 1.20 m according to car speed.

The brace is advantageously arranged in a central position in the shaft bottom, and the opposing buffer element likewise on the car, but a position slightly off-centre is also possible, preferably in the plane of the car guide rails so as not to produce a harmful lateral stress thereon if the car accidentally hits the brace.

The brace is advantageously tubular with a square or rectangular cross-section, said horizontal side surface facing the buffer element being one of the lateral sides of the tube.

The upper surface of the brace is flat and formed perpendicular to the lateral sides of the tube so that it can be horizontal when the brace is in its vertical lifted position.

The buffer is advantageously a block of rubber or a similar damping material with a steel plate attached or vulcanized on its lower side, said plate being cut horizontally at least in accordance with the dimensions of the rubber block and allowing shocks to be absorbed by the complete surface of the block.

Said brace lifting device can be a helical or spiral spring element pushing the brace to return it to the vertical lifted position, wherein the horizontal folded position in service and the vertical maintenance position of the brace are locked by a respective appropriate locking element.

Said brace lifting device can also comprise an hydraulic cylinder or an electric motor device rotating the brace into its horizontal and vertical useful positions.

The lifting device can be remote controlled by the operator, e.g. as soon as the lowest landing door opens, to access the shaft bottom using the operator's safety key, and/or by a direct command from the operator, e.g. a pressure plate in the shaft bottom detecting the operator's presence through his weight and releasing the lock retaining the horizontal position of the brace.

In addition, a safety switch is provided to control the folded service position of the brace and is mounted in series on the command safety chain of the elevator. This switch is locked in the folded service position of the brace and open in the opposite case to stop any displacement of the elevator.

The invention also relates to an elevator fitted with a safety device to protect the operator in the shaft bottom as defined above.

BRIEF DESCRIPTION OF THE DRAWINGS

The invention is illustrated hereafter with a preferred exemplary embodiment described in reference with the appended drawings, in which:

FIG. 1 is a schematic elevation view of the safety device according to the invention in the normal operating position of the elevator, FIG. 2 shows the device with the brace in the lifted maintenance position, FIGS. 3 and 4 show the contact areas on the brace in its folded service position and its lifted maintenance position, respectively.

DETAILED DESCRIPTION

Figure 5:
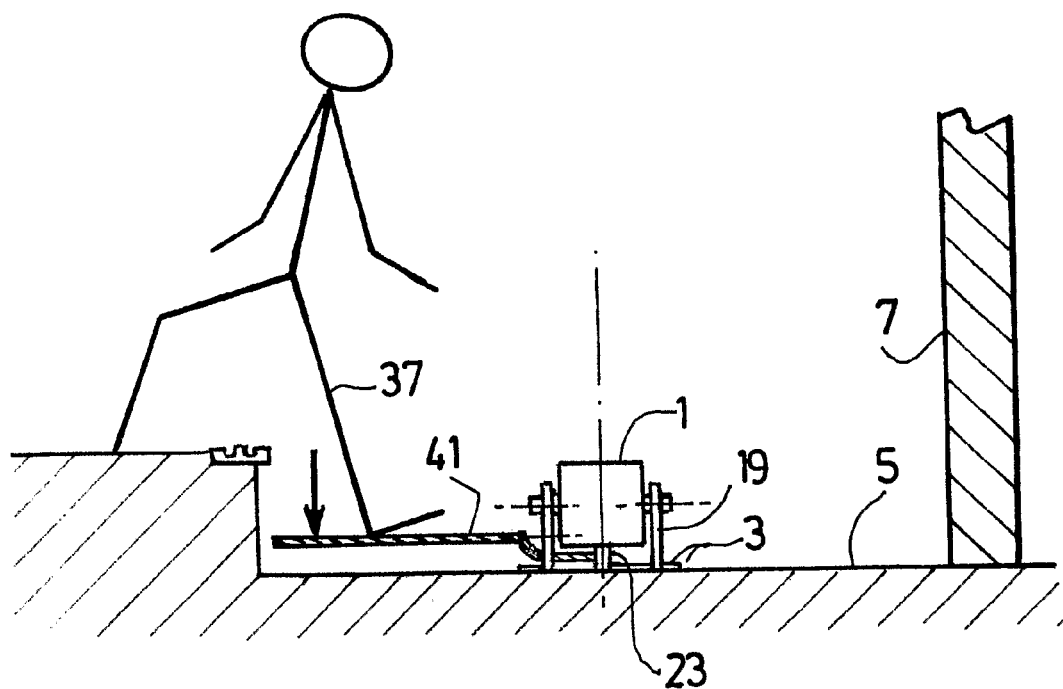
FIGS. 5 and 6 show actuating devices for the safety device according to the invention.

Referring to the drawings, and more particularly to FIG. 1, the safety device for an elevator shaft bottom end to protect the maintenance operator according to this invention mainly comprises a brace 1 pivotally mounted on a base plate 3 secured to the bottom 5 of the elevator shaft 7 and a buffer element 9 secured underneath the elevator car 11 opposite the brace 1.

The buffer element 9 is a cylindrical rubber bloc, the lower surface whereof is secured to a steel plate 13. The cross-section of the horizontal steel plate 13 has a diameter of about 30 cm.

The buffer element 9 is approximately 20 cm thick.

The brace 1 is made of a rigid metal tube with a square cross-section. Its length is of approximately 90 cm and the length of each side of the square is about 20 cm. The side 15 of the right end is closed to form a face perpendicular to the lateral sides.

The base plate 3 is made of a flat bar iron 17 secured to the floor and provided with two outstanding vertical wings 19 arranged on either side of the tube 1. The tube 1 is hinged on the wings 19 by means of a horizontal axle 21 mounted on the supper end of the wings.

The base plate 3 is secured in a central position in the shaft bottom 5.

In normal operation, when the maintenance operator must not access the shaft bottom, the brace 1 is tilted horizontally and held locked in that position by a locking element 23 hooked into a complementary recess 25 in the end surface 15 of the tube.

In this condition, in the event of an accidental uncontrolled fall of the elevator car 11, the latter would fall on the lying horizontal side of the tube 1 and the buffer element 9 would come into contact with the area delimited by a chain dotted line 27 thereon (FIG. 3), therefore substantially on the base thereof, which rises about 25 cm high from the shaft bottom.

A detector switch 29 secured to the floor opposite the tube 1 detects the tilted position of the brace. This switch is mounted in series with the elevator control chain. Since it is closed when the brace is in the tilted position and open otherwise, it allows the elevator car to move only in this condition.

A helical spring 31 secured to the floor or to the plate 3 and to the tube 1 and compressed when the tube 1 is in the horizontal position allows pushing the latter into the vertical position by simple elastic return (FIG. 2), wherein the tube is held in the vertical position by a second locking element 33, which engages another complementary recess 35 of the tube as described above. In this position, as shown in FIG. 2, the height from the bottom end of the shaft to the elevator car in case of accidental uncontrolled fall thereof is of about 110 cm, which is sufficient to prevent a maintenance operator 37 from being crushed by the car. Therefore, this vertical position of the brace 1 allows a maintenance operator 37 to access the shaft bottom. The contact area 39 of the buffer element on the brace is materialized on FIG. 4 by a chain dotted line on the upper surface of the brace, and the contact is applied vertical to the base plate 3 in an area of high resistance, wherein the shock is absorbed by the deformation of the material of the buffer element 9 being squeezed on the lower steel plate 13.

The command to lift the brace 1 in order to protect a maintenance operator 37 accessing the shaft bottom 5 is an important characteristic of the invention. It is described below according to two complementary variations, which can be installed alone or together to complement each other.

According to a first variation (FIG. 5) that protects the direct access of the operator to the bottom shaft, a first access plate 41 is mounted on the shaft bottom 5. This plate covers substantially one half of the bottom surface and is fitted with a pressure detection to detect the weight of at least one foot of the operator to order the release of the element locking the horizontal position 23 of the brace using an appropriate device, so that the spring 31 can instantaneously lift the brace into its vertical position, in which the second lock 33 engages the brace to lock it in its vertical position. The operator is then protected.

The reset to normal operation follows a reverse brace tilting process as the spring 31 is compressed and the element locking the horizontal position 23 is locked again.

Figure 6:
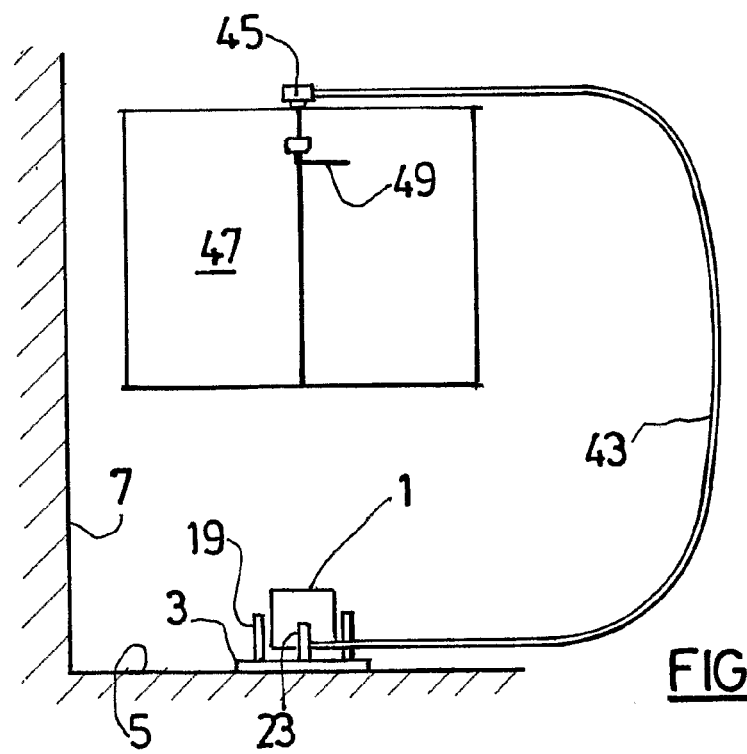

The second variation (FIG. 6) enables the operator to remotely control the displacement of the brace 1 upwards. It consists in laying a cable 43 to control the element locking the horizontal position 23 between the latter and the lock 45 of the landing door 47 at the lowest floor giving access to the shaft bottom. The opening of the safety lock 45 of this door using a classic triangular key 49 automatically causes the release of the lock 23 and the vertical lift of the brace 1, through said cable 23, so that the operator can safely access the bottom shaft.

This order can also be produced electrically by a contact detecting the use of the unlocking key.

The invention claimed is:

1. An elevator system, comprising:
   an elevator car situated for movement within a shaft;
   a buffer element supported on an underside of the elevator car for movement with the elevator car;
   a base plate secured near a bottom of the shaft; and
   a brace hinged on the base plate, the brace comprising a rigid member having a fixed length, the rigid member being moveable between
      a folded position in which the brace cooperates with the buffer element to maintain a distance between the underside of the elevator car and the bottom of the shaft at a first distance and
      a vertical position in which the rigid member has an end spaced from the bottom of the shaft that remains in a fixed position and cooperates with the buffer element to maintain the distance between the underside of the elevator car and the bottom of the shaft at a second, greater distance corresponding to the fixed position of the end of the rigid member.

2. The elevator system of claim 1, wherein the second distance is between 0.8 m and 1.2 m.

3. The elevator system of claim 1, wherein the brace is arranged in a central position at the bottom of the shaft and the buffer element is arranged in a central position on the underside of the elevator car.

4. The elevator system of claim 1, wherein the rigid member comprises a tubular element having a rectangular cross-section.

5. The elevator system of claim 4, wherein the cross-section is square.

6. The elevator system of claim 1, wherein the end of the rigid member comprises an upper surface that is flat and arranged perpendicular to lateral sides of the brace, the upper surface being horizontal when the rigid member is in the vertical position.

7. The elevator system of claim 1, wherein the base plate comprises a flat member secured to the bottom of the shaft, vertically oriented wings and a horizontal axle that is at least partially received by the wings and the brace such that the brace pivots about the horizontal axle relative to the base plate.

8. The elevator system of claim 1, wherein the buffer element comprises a block of damping material and a rigid plate on one side of the block.

9. The elevator system of claim 8, wherein the damping material comprises rubber and the plate comprises steel.

10. The elevator system of claim 1, comprising a brace lifting device including a spring element biasing the brace toward the vertical position; and
    a locking element for selectively locking the brace in the vertical position.

11. The elevator system of claim 1, comprising a brace lifting device at least partially remote from the brace such that the brace lifting device is remotely controllable by an operator.

12. The elevator system of claim 1, comprising a detector switch that detects a position of the brace and provides an indication whether the elevator car should be allowed to move based upon the position of the brace.

13. The elevator system of claim 12, wherein the detector switch provides an indication that the elevator car should not descend when the brace is in the vertical position.

14. The elevator system of claim 1, comprising a brace lifting device associated with the brace for selectively moving the brace between the folded and vertical positions and for securing the brace in a selected one of the positions.

15. The elevator system of claim 14, wherein the brace lifting device is activated responsive to pressure on a pressure plate located near the bottom of the shaft.

16. The elevator system of claim 1, wherein a weight of the brace is centered directly over a pivot point about which the brace is hinged to the base plate when the brace is in the vertical position.

17. The elevator system of claim 1, wherein the rigid member comprises a rigid metal tube.

* * * * *